(12) United States Patent
Miller

(10) Patent No.: US 6,738,474 B1
(45) Date of Patent: May 18, 2004

(54) SYSTEM FOR PROVIDING POTS SPLITTERS EXTERNALLY WITH RESPECT TO DIGITAL SUBSCRIBER LOOP ACCESS MULTIPLEXERS AND REMOTE TERMINAL AND CENTRAL OFFICE EQUIPMENT RACKS

(75) Inventor: Edwin Paul Miller, Aldie, VA (US)

(73) Assignee: ECI Telecom, Ltd., Petach Tikva (IL)

( * ) Notice: Subject to any disclaimer, the term of this patent is extended or adjusted under 35 U.S.C. 154(b) by 0 days.

(21) Appl. No.: 09/511,415

(22) Filed: Feb. 23, 2000

(51) Int. Cl.[7] .......................... H04M 1/00; H04M 9/00; H04M 11/00

(52) U.S. Cl. .............................. 379/413.03; 379/93.09; 379/413.04; 361/785; 361/791; 361/823; 361/824; 361/827

(58) Field of Search .......................... 379/90.01, 93.01, 379/93.05, 93.06, 93.07, 93.09, 93.11, 399.01, 412, 413.02, 413.03, 413.04; 361/228, 333, 748, 756, 785, 791, 823, 824, 826, 827

(56) References Cited

U.S. PATENT DOCUMENTS

| | | | |
|---|---|---|---|
| 4,546,212 A | 10/1985 | Crowder, Sr. .................. 179/2 |
| 4,608,686 A | 8/1986 | Barsellotti ................. 370/69.1 |
| 4,750,170 A | 6/1988 | Zeller, Jr. et al. ............. 370/76 |
| 4,754,273 A | 6/1988 | Okada et al. ............ 340/825.2 |
| 5,153,910 A | 10/1992 | Mickelson et al. ......... 379/399 |
| 5,163,090 A | 11/1992 | Pawlowski et al. ......... 379/399 |
| 5,177,782 A | 1/1993 | Henderson et al. ......... 379/412 |
| 5,247,347 A | 9/1993 | Litteral et al. ................ 358/85 |
| 5,528,281 A | 6/1996 | Grady et al. .................... 348/7 |
| 5,550,916 A | 8/1996 | Daoud ........................ 379/399 |
| 5,613,190 A | 3/1997 | Hylton ........................ 455/3.1 |
| 5,625,404 A | 4/1997 | Grady et al. .................... 348/7 |
| 5,625,677 A | 4/1997 | Feiertag et al. ............... 379/93 |
| 5,629,926 A | 5/1997 | Deutsch et al. ............. 370/252 |
| 5,682,423 A | 10/1997 | Walker ........................ 379/252 |
| 5,684,825 A | 11/1997 | Ko .............................. 375/222 |
| 5,703,944 A | 12/1997 | DeBalko ..................... 379/399 |
| 5,757,803 A | 5/1998 | Russell et al. ............... 370/494 |
| 5,790,548 A | 8/1998 | Sistanizadeh et al. ....... 370/401 |
| 5,802,283 A | 9/1998 | Grady et al. ........... 395/200.12 |
| 5,812,786 A | 9/1998 | Seazholtz et al. ...... 395/200.63 |
| 5,815,505 A | 9/1998 | Mills .......................... 370/522 |
| 5,825,819 A | 10/1998 | Cogburn ..................... 375/257 |
| 5,905,781 A | * 5/1999 | McHale et al. .......... 379/93.14 |
| 6,014,431 A | * 1/2000 | McHale et al. .......... 379/93.14 |
| 6,371,780 B1 | * 4/2002 | Aponte et al. .............. 439/188 |

(List continued on next page.)

OTHER PUBLICATIONS

Hotwire™ 5000 Series POTS Splitters Data Sheet, http://partnerweb.baynetworks.com/Products/datasheets/dspots.html, Dec. 23, 1998.

(List continued on next page.)

Primary Examiner—Binh Tieu
(74) Attorney, Agent, or Firm—Nath & Associates PLLC; Harold L. Novick (57) ABSTRACT

POTS splitter devices are provided which are externally mounted with respect to digital subscriber loop access multiplexers and remote terminal and central office equipment racks. A cable having in-line sockets for receiving a combination POTS splitter and surge protection device provides POTS-only signals from a customer's premises to channel banks. The cable is connected to a protection panel configured so as not to consume equipment rack space. A multiport enclosure is provided with a multiport POTS splitter and surge plugs to transmit POTS signals from plural telephone lines to line termination equipment, and at least xDSL signals to a DSLAM via a cable. A multiport POTS splitter enclosure is also provided with connectors for externally mounted surge plugs. A protection panel is provided with integrated POTS splitters, xDSL filters and surge plugs to support plural telephone lines.

9 Claims, 8 Drawing Sheets

U.S. PATENT DOCUMENTS

| | | | | |
|---|---|---|---|---|
| 6,404,861 B1 | * | 6/2002 | Cohen et al. | 379/93.01 |
| 6,519,162 B1 | * | 2/2003 | Witty et al. | 361/796 |
| 6,614,665 B2 | * | 9/2003 | Witty et al. | 361/826 |
| 6,628,525 B2 | * | 9/2003 | Miller et al. | 361/756 |

OTHER PUBLICATIONS

Siecor: xDSL Technology product page, http://www.siecor.com/public/xdsl.htm, Dec. 30, 1998.

Siecor: Protectors web page, http://www.siecor.com/public/dfsprot.htm, Dec. 30, 1998.

UMC Retrofit Kit Overview, http://www.fibre.com/products/Install//retrooverview.asp, Dec. 23, 1998.

Press Release entitled "Siecor and Orckit Announce Joint Development for Integrated Pots Splitters", http://www.orckit.com/pr/1998/980601.html, Jun. 1, 1998.

Draft ANSI Standard T1.413–1998 for Network and Customer Installation Interfaces–Asymmetric Digital Subscriber Line (ADSL) Metallic Interface, Annex E–Pots Splitter Requirements, pp. 189–201 (1998).

* cited by examiner

SYSTEM FOR PROVIDING POTS SPLITTERS EXTERNALLY WITH RESPECT TO DIGITAL SUBSCRIBER LOOP ACCESS MULTIPLEXERS AND REMOTE TERMINAL AND CENTRAL OFFICE EQUIPMENT RACKS

FIELD OF THE INVENTION

The invention relates to POTS splitter devices that are mounted externally to digital subscriber loop access multiplexers in remote terminal and central office equipment racks.

BACKGROUND OF THE INVENTION

Providing high rate digital transmissions over the local subscriber loops of telephone companies is advantageous since the infrastructure for such local subscriber loops is currently in existence. High-rate digital subscriber loop (DSL) data services have been implemented using transmission technologies such as asynchronous DSL (ADSL), synchronous DSL (SDSL), high-speed DSL (HDSL), and very high-speed DSL (VDSL), which are generally referred to as xDSL.

Figures 1, 2:
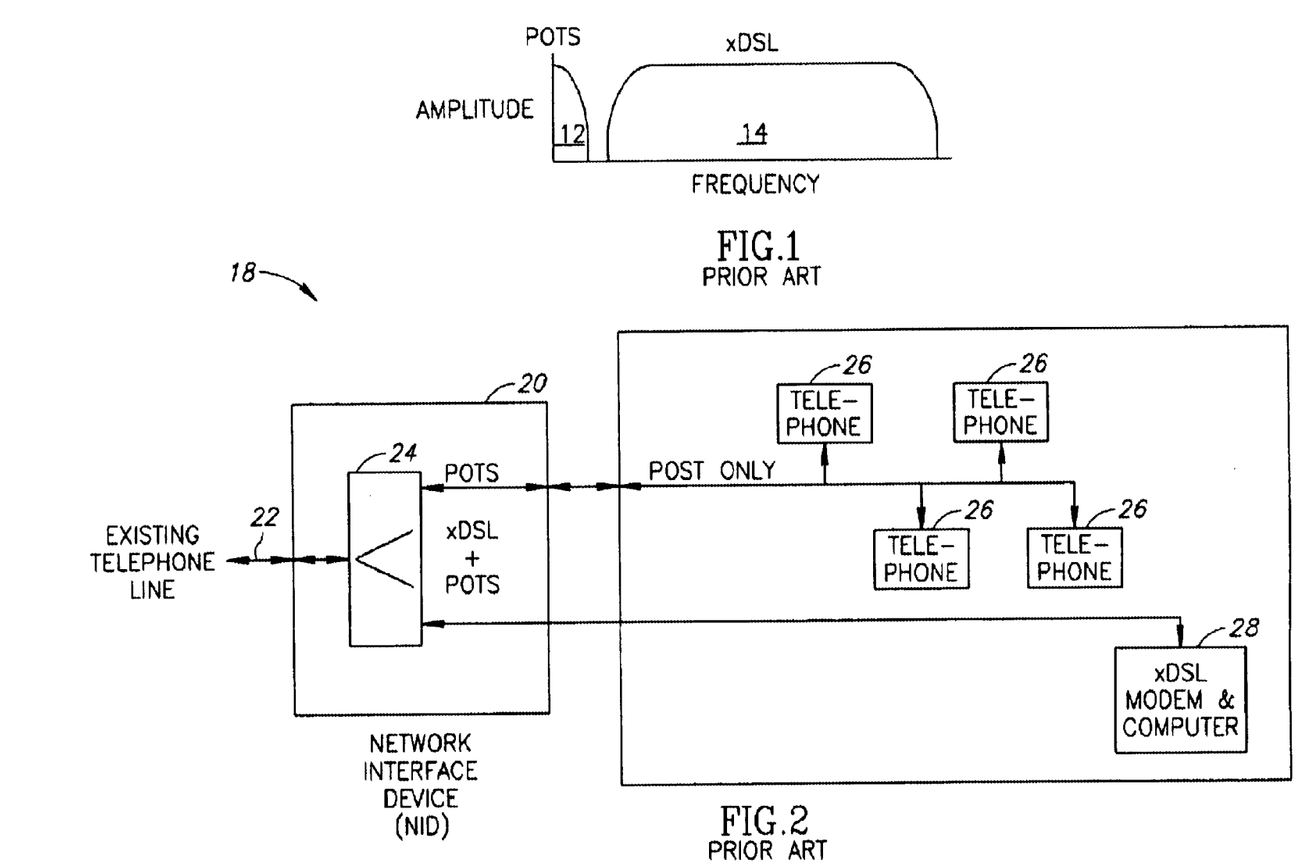
FIG. 1 illustrates frequency spectra for POTS signals and xDSL signals.
FIG. 2 is a block diagram of customer premises configured for POTS and xDSL service.

High-speed digital transmissions available via xDSL share the same DSL with analog telephony (i.e., plain old telephone service (POTS)). POTS and xDSL are transmitted on the same analog telephone lines using frequency division multiplexing. For example, POTS transmissions generally occur in a frequency range 12 of 0 Hertz (Hz) to 4 kiloHertz (kHz). xDSL transmissions use higher frequencies such as 20 kHz to 1.1 MegaHertz (MHz). With reference to FIG. 1, xDSL frequencies 14 use higher frequency bands that do not overlap with the analog voice or POTS frequency range. This allows for the use of high-pass filters (HPFs) and low-pass filters (LPFs) to separate the POTS and xDSL signals at both ends of the DSL transmission line. Separate frequency bands can also be allocated for upstream xDSL transmissions toward the network (e.g., a central office (CO) or local exchange (LE)) and downstream xDSL transmissions toward customer premises. Thus, xDSL permits data transfer on existing telephone lines in both directions simultaneously, and does not interfere with analog telephone transmissions.

To provide DSLs to customer premises, customer premises xDSL equipment is needed, as well as POTS equipment for voice calls. As shown in FIG. 2, telephone company equipment (e.g., a remote terminal (RT) or CO) which accommodates xDSL data transmissions is also needed. The customer premises 18 can comprise, for example, a network interface device (NID) 20 connected to an analog telephone line 22. The NID 20 comprises a LPF or POTS splitter 24 that filters high frequency xDSL signals and passes low frequency POTS signals to POTS equipment such as telephones 26. xDSL modems use a HPF to attenuate POTS signals to recover the data signals in the higher frequency bands.

Figure 3:
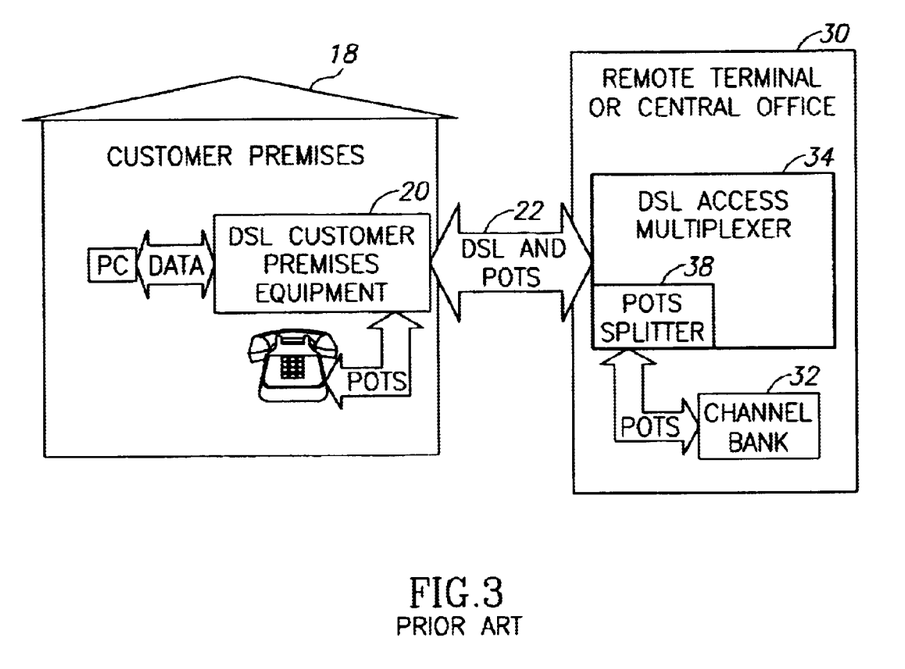
FIG. 3 is a block diagram of customer premises and a remote terminal or central office configured for POTS and xDSL service.

With reference to FIG. 3, the RT or CO 30 receives signals from and provides signals to the telephone line 22 which can have POTS signaling, as well as xDSL data transmissions. The RT or CO 30 generally comprises channel banks (CBs) 32 or other voice termination equipment for processing voice calls, and a DSL access multiplexer 34 hereinafter referred to as a DLSAM for processing xDSL transmissions. Different types of DSLAMs include, but are not limited to, a central office DSLAM, a remote DSLAM and remote ADSL multiplexers.

The RT 30 is generally contained in a cabinet containing the RT termination equipment (e.g., channel banks), an auxiliary power source and protection devices to protect telephony devices against unwanted voltage and current. The cabinet is located remotely with respect to the CO. The CO comprises termination and switching equipment, much of which is mounted in equipment racks. The amount of rack space available for accommodating equipment such as DSLAM to provide new services is limited and must be used efficiently.

With continued reference to FIG. 3, DSLAMs 34 are typically provided with circuitry 38 for passing POTS signals to voice call processing circuits such as CBs 32, and for passing xDSL data to xDSL processing circuits. A LPF can be used to filter xDSL data signals from incoming telephone lines and pass POTS-only signals to the channel bank or telephone. HPFs are provided on-site at the customer premises and at the CO or RT to filter out POTS signals and pass only the xDSL signals to the appropriate processing circuits. In existing systems, POTS splitters are used in the on-site NID 20 and in a DSLAM or POTS splitter rack at a CO or RT to filter POTS signals.

Figure 4:
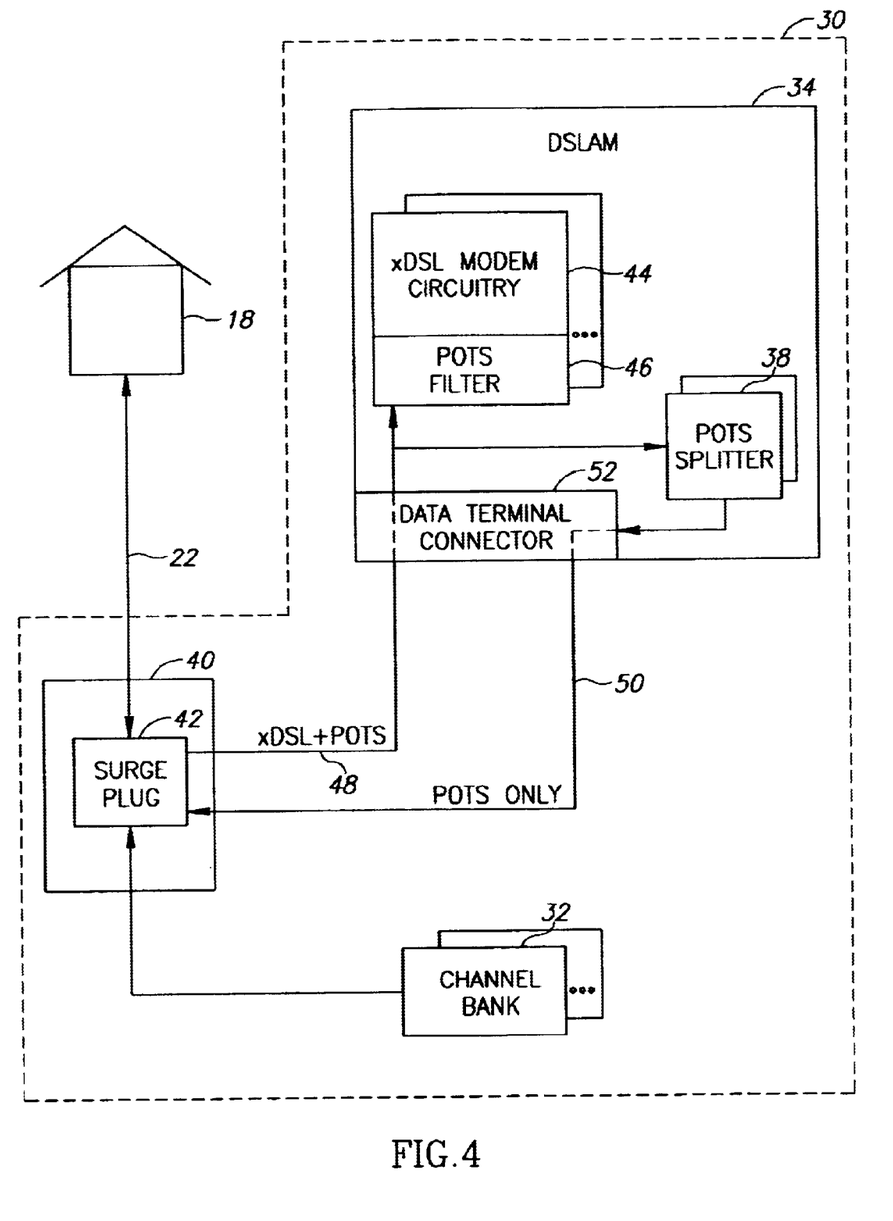
FIG. 4 is a block diagram of a remote terminal or central office having a DSLAM and protection panel.

The processing of POTS and xDSL signals at an RT or CO will now be described in further detail with respect to FIG. 4. FIG. 4 illustrates a portion of an exemplary DSLAM 34 located within an RT or CO 30. The RT or CO 30 is provided with a protection panel 40 comprising at least one surge plug 42. A telephone line 22 from a subscriber's premises 18 comprises POTS and xDSL signaling. The telephone line 22 enters the RT or CO 30 and through the protection panel 40 to an xDSL modem circuit 44. A POTS filter 46 (e.g., a high pass filter) can pass the xDSL transmission to the xDSL modem circuit 44 for processing. The xDSL modem converts the signal to data packets or asynchronous transfer mode (ATM) cells which are forwarded to a data switch, router or multiplexer. The line 48 from the protection panel 40 also provides the POTS and xDSL signaling from the subscriber's premises to POTS-only circuits. A POTS splitter 38 passes the POTS signals which are then sent through the protection panel, as indicated by the line 50 to a CB 32.

Existing DSLAMs 34 incorporating internal POTS splitters 38 have several disadvantages and therefore present a number of drawbacks to implementing xDSL transmissions in subscriber loops. POTS splitters are generally passive devices comprising an inductive coil. The coil is generally large with respect to printed circuit board (PCB) area on which the POTS splitter and other POTS circuitry is provided. Optimization of PCB area is important to minimize the volume or space within the chassis of the termination equipment enclosing the PCB.

The size of the chassis of a DSLAM 34 or RAM is a concern of vendors for telecommunications equipment since their customers (e.g., telephone service providers) have a limited amount of rack space at their COs and in their RTs, as stated previously. In other words, the larger the profile of the DSLAM chassis, for example, the more rack space that is required at the CO or RT to accommodate DSL service using that vendor's DSLAM, and the more likely that the smaller DSLAMs of competing vendors will be chosen. For example, a POTS splitter can require on the order of 2.5 cubic inches of PCB area. Reducing size of the coil in the POTS splitter is not a desirable option since the effectiveness of a POTS splitter can be compromised. A high inductance with a high quality or Q factor is desirable for a coil in a POTS splitter.

In addition to consuming valuable space within a DSLAM 34, internal POTS splitters 30 are problematic because the filtering of high frequency signals (e.g., xDSL signals) inside a DSLAM can present electromagnetic interference problems with xDSL circuitry 44 in close proximity to the POTS splitters 38. Also, POTS signals routed through the DLSAM 34 are lightning-exposed. Thus, POTS splitters require large clearances, in addition to the PCB area and DSLAM internal volume taken by virtue of their size. POTS splitters therefore preclude the use of fine-pitch front panel connectors to reduce the consumption of front panel space (e.g., the face plate of the DSLAM when rack mounted) and PCB area. Accordingly, a need exists for DSL equipment such as a DSLAM or RAM that economizes space at an RT and CO.

An existing central office POTS splitter that is externally mounted with respect to a DSLAM is commercially available. The POTS splitter is provided with other POTS splitters in a rack mountable chassis. A chassis that supports as many as 72 tip and ring pairs is on the order of nine inches high and therefore consumes considerable rack space. Thus, a need exists for POTS splitters that are externally mounted with respect to both the DSLAM and the racks in an RT or CO.

In addition to the size and space considerations of using internal or external, rack-mounted, POTS splitters, existing DSLAMs 34 are characterized by other drawbacks. For example, lightning trace clearances also consume significant PCB routing resources and require large-pitch, board-to-board PCB connectors. In addition, tip and ring lines routed through a DSLAM are individually fused using lightning-tolerant fuses to prevent surges from causing hazardous conditions within the DSLAM, resulting in two large fuses per port within the DSLAM. Thus, a need exists for a DSLAM which reduces the space and routing resources consumed by protection devices such as fuses and PCB routing and connectors having lightning trace clearance.

Another problem is presented when servicing existing DSLAM. To service a DSLAM, the xDSL cable is disconnected from the DSLAM (e.g., from the DSLAM connector 52, resulting in the interruption of POTS connections (e.g., line 54 in FIG. 4). In addition, the DSLAM connector 52 transports twice as many signals than is necessary. In other words, the connector 52 carries POTS and xDSL tip/ring pairs from the customer premises (e.g., from line 48), and POTS-only tip and ring signals routed to the CB (e.g., via line 50). A need exists for a DSLAM configuration that reduces the DSLAM connector ports consumed by POTS-only signals to increase the number of xDSL ports that can be terminated at a DSLAM in a given amount of rack space.

SUMMARY OF THE INVENTION

In accordance with the present invention, a system for externally mounting POTS splitters with respect to a DSLAM and to RT and CO equipment racks is provided which overcomes the deficiencies of existing DSLAMs and realizes a number of advantages.

In accordance with an embodiment of the present invention, the POTS splitters are provided, along with protection devices, to in-line sockets of a cable connecting both the telephone line from customer premises and the DSLAM to a protection panel mounted in the RT cabinet or proximally to a CO rack. Thus, the POTS splitters are arranged so as not to consume rack space.

In accordance with another embodiment of the present invention, a number of cables are terminated into an enclosure having multiple ports for respective cables. A multiport POTS splitter is provided, as well as a corresponding number of surge plugs for the respective ports. A single xDSL-only port is provided in the enclosure for a cable extending from the enclosure to a DSLAM.

In accordance with yet another embodiment of the present invention, an enclosure is provided with multiple ports for connection to telephone lines from subscribers' premises. A surge plug is externally mounted to the enclosure for each port, and a multiport POTS splitter is provided internally. A single xDSL-only cable extends from the enclosure to a DSLAM.

In accordance with still yet another embodiment of the present invention, an integrated protection panel is provided which comprises a plurality of modules for connecting to respective customer premises. Each module comprises a surge protector and a POTS splitter, as well as ports for connecting to the telephone line from the customer premises, a POTS-only line to the channel bank and a line to the DSLAM.

BRIEF DESCRIPTION OF DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 5:
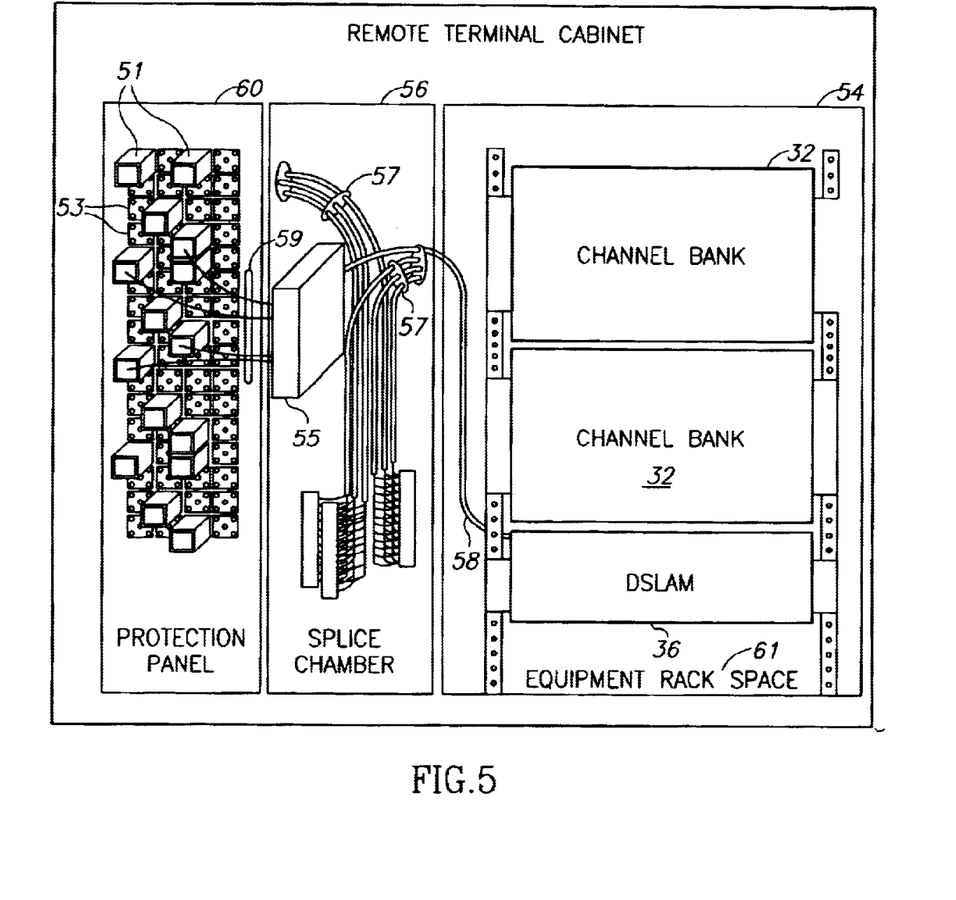
FIG. 5 illustrates a protection panel configured in accordance with an embodiment of the present invention.

In accordance with an embodiment of the present invention, a protection panel 60 and its orientation with respect to equipment racks 61 in an RT or CO 30 is illustrated in FIG. 5. The protection panel 60 is located within the cabinet 54 of an RT. For example, the protection panel 60 is removably affixed in the space in an RT cabinet 54 that is usually reserved for maintenance work. The protection panel 60 can also be provided proximally with respect to a CO equipment rack in which one or more DSLAMs 36 are mounted or affixed to the side of the DSLAM 36 or rack, among other configurations. The protection panel 60 is advantageous in that it does not consume rack space (e.g., equipment rack space 61). A combination POTS splitter and surge protection device 55 is also provided in the splice chamber 56, for example.

With further reference to FIG. 5, the protection panel 60 comprises a plurality of connectors 53 for connecting telephone lines 22 to a channel bank 32 via lines 59 in a conventional manner. As will be described below, plugs 51 are connected to respective ones of the connectors 53 on a protection panel. The plugs are also connected to a combination POTS splitter and surge protection device 55 via lines 59. The device 55 provides POTS signals to the channel banks 32 via the lines 57, and xDSL traffic to the DSLAM 36 via the cable 58.

Figure 6:
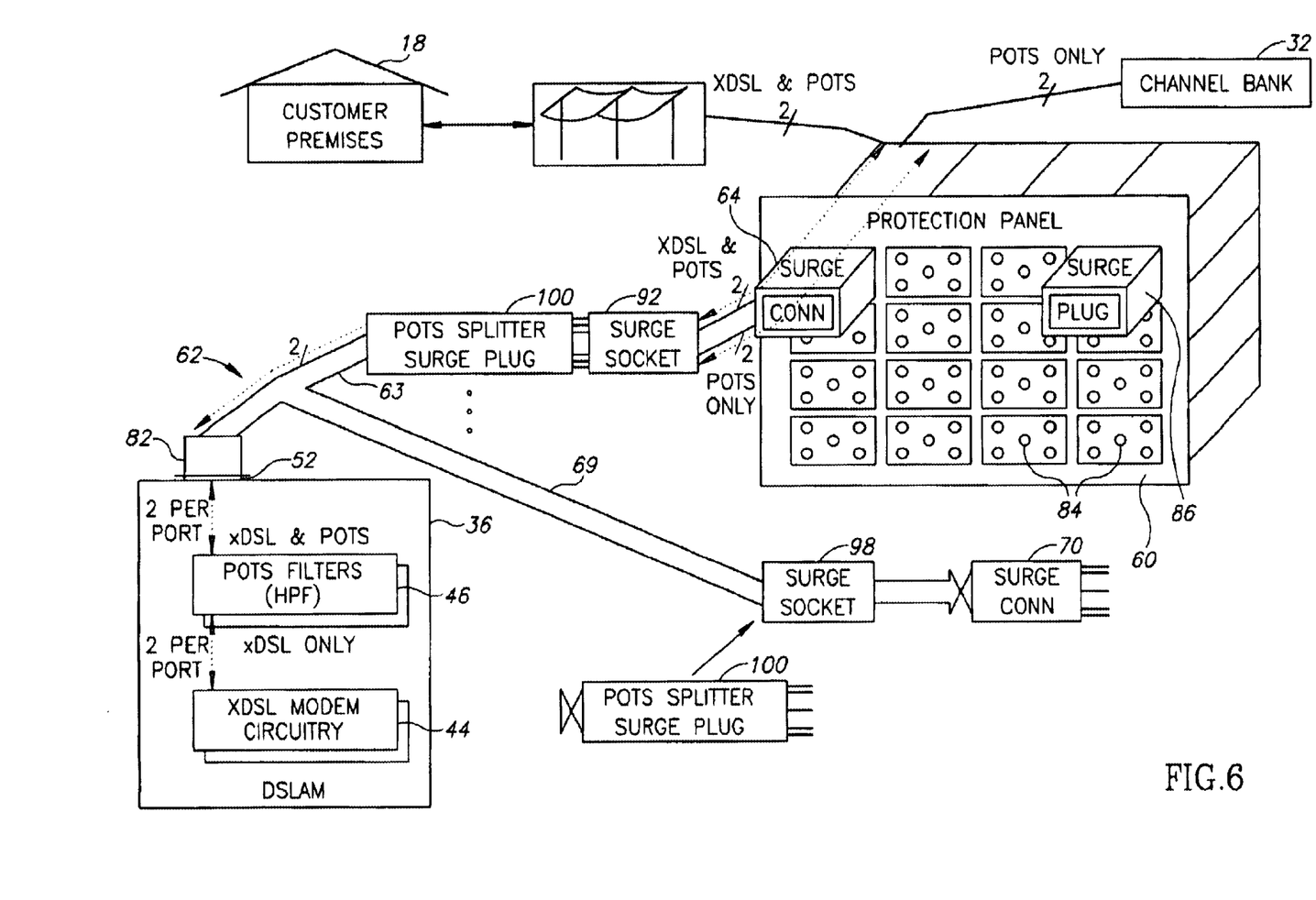
FIG. 6 illustrates a protection panel and a cable having in-line sockets for a combination POTS splitter and surge protector plug constructed in accordance with an embodiment of the present invention.
Figures 7, 8, 9:
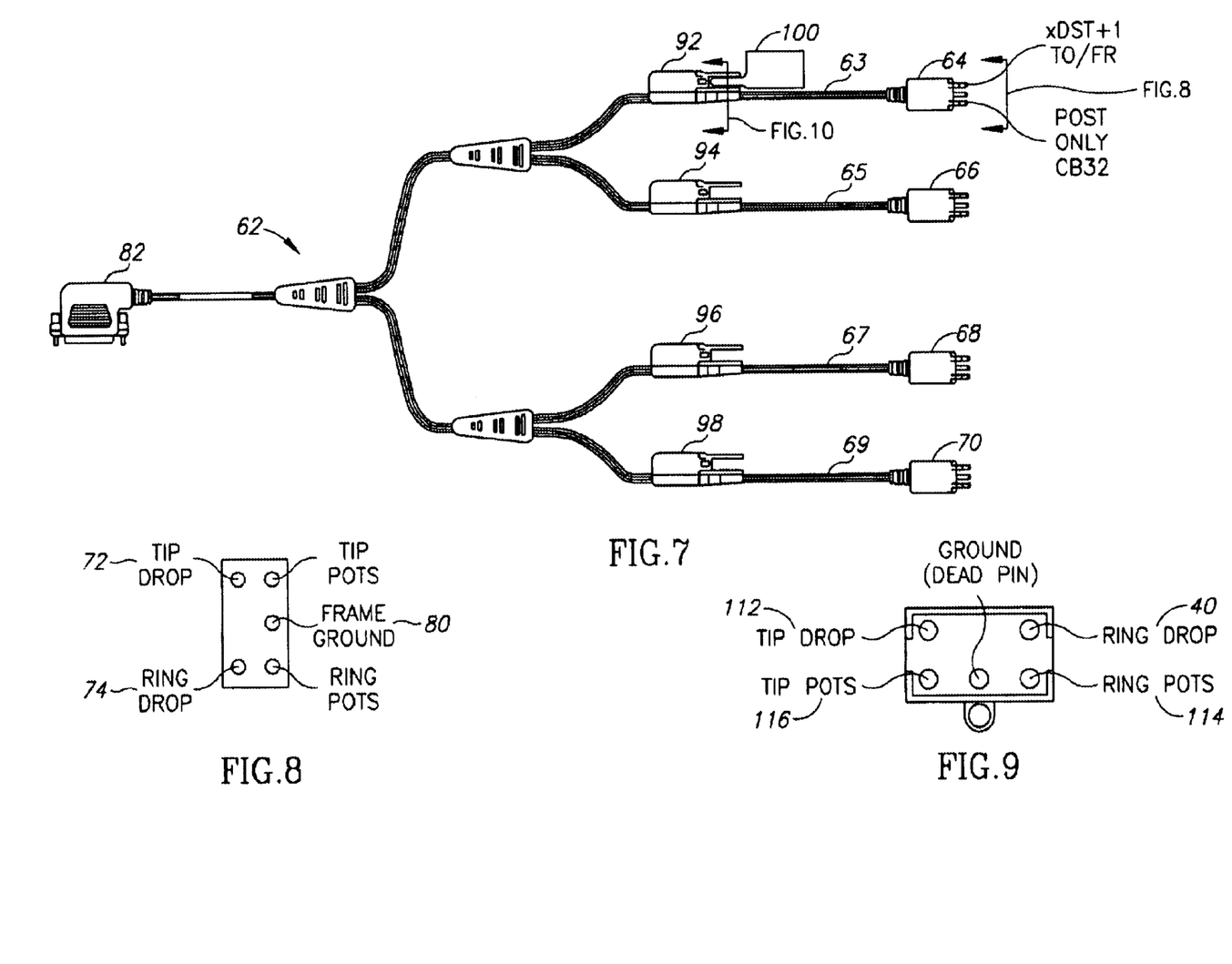
FIG. 7 depicts a cable having in-line sockets and a combination POTS splitter and surge protector plug constructed in accordance with an embodiment of the present invention.
FIG. 8 is a front elevational view of a connector on the cable depicted in FIG. 7.
FIG. 9 is an elevational front view of an in-line socket of the cable depicted in FIG. 7.

With reference to FIG. 6, a cable 62 is provided which is connected to the protection panel 60, to at least one DSLAM 36, and to POTS termination equipment such as a CB 32. In the embodiment illustrated in FIG. 7, the cable 62 comprises four telephone lines 63, 65, 67 and 69 terminating at respective ends thereof with four 5-pin plugs 64, 66, 68 and 70 for connecting to the protection panel 60. Only two of the lines are shown in FIG. 6 for illustrative purposes. The 5-pin plugs are compatible with the industry standard protector plug footprint, as shown in FIG. 8. The plugs have two tip-ring pairs 72 and 74, and 76 and 78, respectively, and a frame ground pin 80. The other ends of the telephone lines are terminated at corresponding pins of a 25-pin data terminal connector 82. The 25-pin connector is for connecting to a DSLAM 36. The cable 62 can be, for example, a 4-port ADSL protector displacement cable manufactured by Westek Electronics, Inc., Scotts Valley, Calif. It is to be understood that the cable 62 can support fewer or more telephone lines. Accordingly, fewer or more than four plugs can be provided for connection to the protection panel 60. In addition, a connector 82 to the DSLAM can have a smaller or larger number of pins, or plural data terminal connectors can be used.

With continued reference to FIG. 6, the protection panel 60 is preferably provided with a plurality of sockets indicated generally at 84. Similarly, the DSLAM 36 is provided with a socket 52 for receiving the 25-pin connector 82 of the cable 62. In accordance with alternative embodiments of the invention, the cable 62 can be provided with socket connectors for connecting to the protection panel 60, or a data terminal socket for connecting to the DLSAM 36, provided that the protection panel and the DSLAM have compatible male connectors.

With continued reference to FIGS. 6 and 7, the cable 62 is provided with in-line sockets 92, 94, 96 and 98 on respective ones of the telephone lines 63, 65, 67 and 69 for receiving, for example, a surge plug. In accordance with the present invention, a combination surge plug and POTS splitter 100 is inserted into each in-line socket. To install the cable 62 and the external POTS splitter device 100, an installer first removes a surge plug 86 from the protection panel 60 and substitutes in its place an end of the cable (e.g., plug 64). As stated previously, each of the plugs 64, 66, 68 and 70 comprises five pins, as shown in FIG. 8. Two of the pins can be used for the POTS and xDSL signals on the incoming telephone line 22, for example. The other pair of pins can be used to transport POTS only signals to and from the CB 32. The combination surge plug and POTS splitter 100 comprises surge protection circuitry and an LPF for passing the POTS signals. The POTS signals are provided to a CB 32 or other POTS terminal equipment via an electrical path (e.g., telephone line 102) extending between the protection panel socket in which the plug 64 is inserted and the CB 32.

The use of an external POTS splitter such as the combination surge plug and POTS splitter 100 overcomes a number of the above-described disadvantages of existing DSLAMs. For example, POTS for subscribers is no longer aggregated on DSLAM 36 ports, as is the case with the DSLAM 34. The DSLAM 36 of the present invention can use two conductors per port since the external POTS splitter device allows for POTS signals to be directed to a channel bank or other equipment independently of the DSLAM 36. The conventional DSLAM 34, on the other hand, employs four conductors per port, including two conductors to provide POTS signals to channel banks or other termination equipment. Thus, the data terminal connector 82 of the cable 62 can be disconnected to allow the servicing of the DSLAM 36 without interrupting POTS. Further, the POTS splitters no longer reside in the DSLAM, and therefore no longer consume valuable space within the DSLAM and the racks or cause electromagnetic interference problems with xDSL circuitry in the DSLAM. In addition, large clearances required for lightning-exposed POTS signals are no longer required in the DSLAM, thereby allowing for the use of fine-pitch front panel connectors and reducing the consumption of PCB area within the DSLAM for POTS signal processing. Thus, more xDSL processing circuits can be enclosed in a DSLAM without increasing its size or the rack space the DSLAM will consume. Also, the two large, lightning-tolerant fuses that are typically provided at each DSLAM port for POTS tip and ring lines can now be eliminated.

A cross-section of an in-line socket (e.g., socket 92) is depicted in FIG. 9. The combination surge plug and POTS splitter 100 comprises four pins that are received in corresponding ones of the sockets 110, 112, 114 and 116 in the in-line socket 92, for example. The four pins are connected to respective ones of the two tip and ring pairs in the lines 63, 65, 67 and 69. The lines connected to the connector 82 transport xDSL and POTS signals.

In an alternative embodiment, a high pass filter can be provided in an in-line socket, along with a combination surge plug and POTS splitter 100, in lieu of using a POTS filter 46 in the DSLAM 36. The POTS filter is preferably in the DSLAM 36 due to analog signal processing considerations.

The protection panel 60 can be, for example, a printed circuit board-type substrate comprising a matrix of apertures. The tip-ring pairs of a telephone line terminating at the protection panel 60 can be connected to a 5-pin plug or connector mounted thereon, or to corresponding ones of the apertures in a conventional manner such as by a solder connection. Alternatively, the protection panel can be a board comprising friction-type connectors such as spade or crimp-type terminal connectors for affixing a telephone line to the patch panel and/or to another telephone line terminating at the protection panel. Other devices such as surge protectors and POTS slitters can be connected to the protection panel, or to the lines extending from the customer premises 18, CB 32 or the DSLAM 36 to the protection panel to process signals (e.g., POTS or xDSL signals).

As xDSL port density requirements increase, managing many cables with or without in-line POTS splitters can be cumbersome and expensive mainly due to the cost of the cable. In accordance with another embodiment of the present invention, a combination surge plug and POTS splitter configuration is provided which is less cumbersome than the above-described embodiment using a cable 62.

Figure 10:
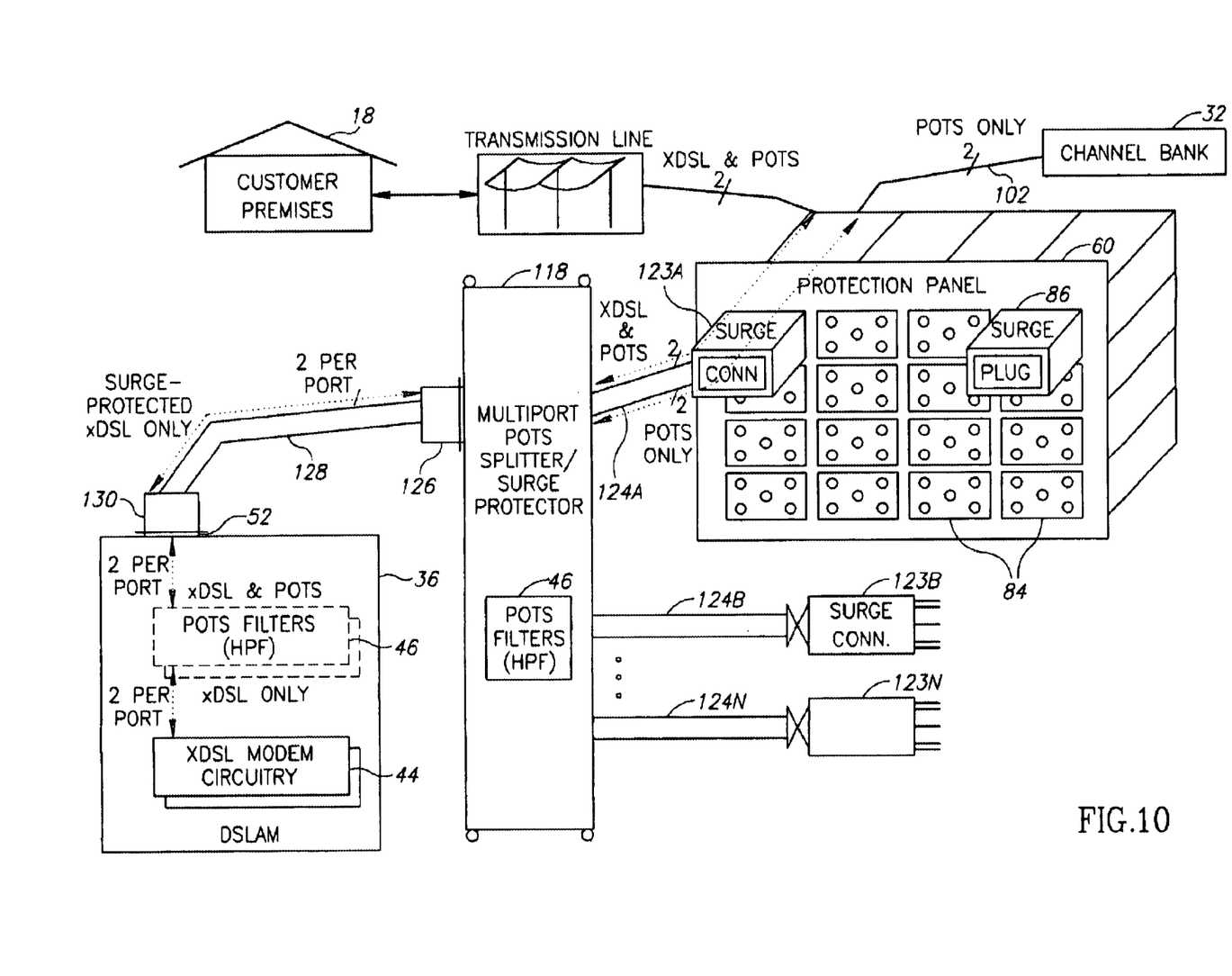
FIG. 10 is a block diagram of an enclosure comprising a multiport POTS splitter and surge protector and dedicated xDSL cable constructed in accordance with an embodiment of the present invention.

As shown in FIG. 10, a multiport device 118 is provided which comprises a plurality of ports 120a, 120b, . . . , 120n for allowing a plurality of telephone lines 124a, 124b, 124c . . . , 124n to be connected at one end thereof to the multiport device 118. The other end of each of the plurality of telephone lines can be terminated, for example, with a conventional 5-pin connector, as indicated at 123a, 123b, . . . , 123n. The multiport device 118 is a multiport POTS splitter and surge protector for processing the POTS and xDSL signals on the respective incoming telephone lines 124a through 124n. The ports 120a through 120n can be connected to telephone lines extending to CBs or other POTS termination equipment for directing POTS signals passed by a LPF at the multiport device 118 toward POTS termination equipment. The multiport device 118 comprises a connector 126 and cable 128 that receives xDSL and POTS signals. Alternatively, the multiport device 118 can be provided with a high pass filter and pass only xDSL signals to the DSLAM 36 via the cable 128. Accordingly, the DSLAM can be configured without the POTS filters 46.

The multiport device 118 is preferably secured in an RT cabinet or near a rack of equipment at a CO using hooks or cable ties. Thus, if the multiport device 118 is placed within a cabinet so as to impede access to cable splices or other cabinet contents, the multiport device 118 can be moved aside, and then returned to its original position after servicing, with relative ease. By removing POTS return pairs (e.g., line 102 in FIG. 6) from the connectors 126 and 130, more xDSL ports can be supported at the DSLAM, thereby improving front panel density and PCB density of the DSLAM. Furthermore, POTS-to-xDSL coupling and proximity issues are eliminated in the xDSL-only cable 128 and its connectors 126 and 130. In addition, the cable 128 is a more simple and less costly cable than the cable 62 depicted in FIG. 7. The cable 128 can be constructed from a multiconductor cable and two identical connectors and need not have in-line sockets (e.g., socket 92) toward the CBs 32. The xDSL cables can be constructed to have varying lengths cost effectively. Cost savings is also achieved via the monolithic characteristic of the multiport POTS splitter and surge protection device combination in the multiport device 118. Plural solid state or gas tube surge protectors can be mounted on PCBs inside the chassis of the multiport device 118, as opposed to using sockets and conventional individual surge plugs.

Figure 11:
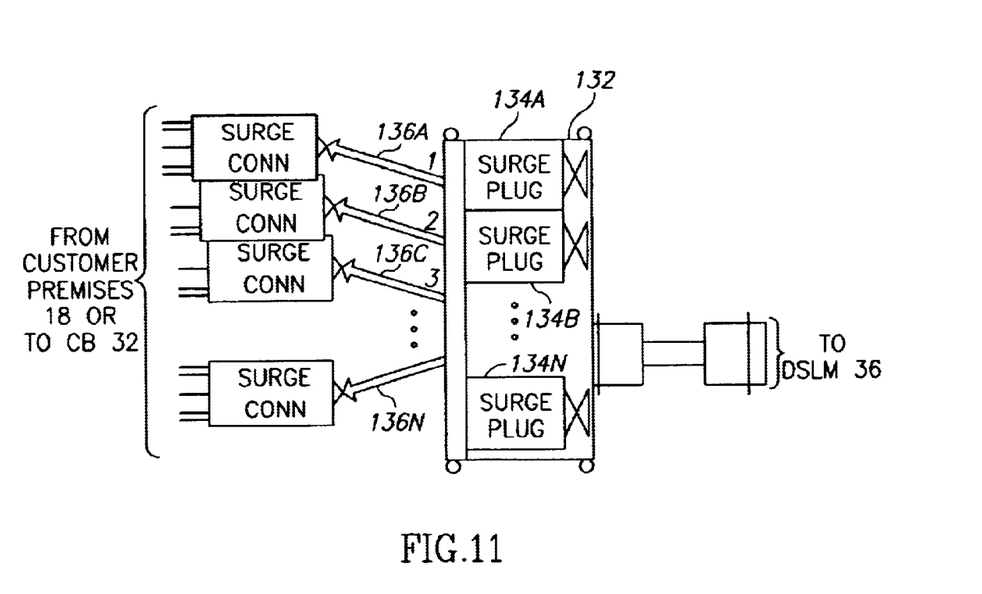
FIG. 11 is a block diagram of an enclosure comprising a multiport POTS splitter and externally mounted surge plugs and dedicated xDSL cable constructed in accordance with an embodiment of the present invention.

In accordance with another embodiment of the present invention illustrated in FIG. 11, a multiport device 132 comprising a multiport POTS splitter can be provided with external surge plugs 134a, 134b, . . . , 134n for a corresponding number of telephone lines 136a, 136b, . . . , 136n to allow greater flexibility in selecting and installing different types of surge plugs. Also, if one of the surge protection fuses blows, the surge protection can be replaced with relative ease.

Figure 12:
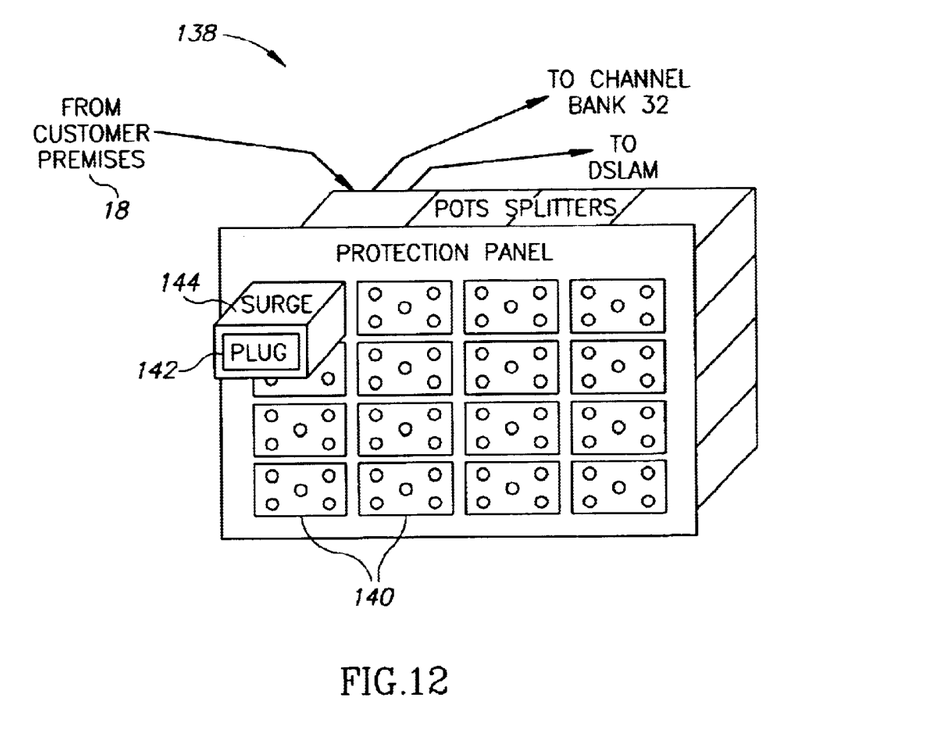
FIG. 12 is a front isometric view of a protection panel having integrated POTS splitters and female connectors for surge plugs constructed in accordance with an embodiment of the present invention.

In accordance with the embodiment of the present invention depicted in FIG. 12, a protection panel 138 integrates POTS splitters 140a, 140b, . . . 140n with respective ports 142a, 142b, . . . , 142n. Surge protectors 144a, 144b, . . . , 144n are also provided at ports 142a, 142b, . . . , 142n, respectively. Each port 142 supports a telephone line 22 from a customer's premises 18 carrying xDSL signals and POTS signals. The POTS signals are filtered by the POTS splitter 140 and provided to an analog termination device such as a CB 32. The xDSL signals are also filtered and provided to a DSLAM 34.

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. An apparatus for connecting plain old telephone service (POTS) splitters externally with respect to a digital subscriber line (DSL) access multiplexer in telephone service provider equipment, the telephone service provider equipment being located remotely with respect to customer premises and having line termination equipment for processing POTS signals transmitted on telephone lines between a central office or local exchange and customer premises, the DSL access multiplexer providing digital subscriber line or xDSL service to customer premises on the telephone lines, a cable having a first end connected to at least one of the telephone lines from customer premises, a second end connected to the DSL access multiplexer, and an in-line socket, the in-line socket having four socket terminals for two tip-ring pairs, the apparatus comprising:

a POTS splitter device comprising a housing and four splitter terminals and being configured for insertion in said in-line socket of said cable, said four splitter terminals being electrically connected to respective ones of said four socket terminals when said POTS splitter device is inserted into said in-line socket on said cable, said POTS splitter device having a filter circuit operable to pass said POTS signals.

2. An apparatus as claimed in claim 1, wherein said first end of said cable comprises an electrical connector having at least two tip-ring pairs, a first one of said pairs being connected to one of said telephone lines from said customer premises for transporting xDSL signals and said POTS signals, and a second one of said pairs providing said POTS signals passed via said filter circuit to and from said at least one of said line termination equipment.

3. An apparatus as claimed in claim 2, wherein said system further comprises a panel having ports and being at least removably installed externally with respect to said DSL access multiplexer, said first end of said cable being connected to said panel so as to be electrically connected to a first set of said ports, said at least one of said line terminal equipment channel banks being electrically connected to said first set of ports.

4. An apparatus as claimed in claim 1, wherein said POTS splitter device further comprises an overvoltage protection circuit.

5. An apparatus for connecting plain old telephone service (POTS) splitters externally with respect to a digital subscriber line (DSL) access multiplexer in telephone service provider equipment, the telephone service provider equipment having line termination equipment for processing POTS signals transmitted on telephone lines between a central office or local exchange and customer premises, the DSL access multiplexer providing digital subscriber line or xDSL service to customer premises on the telephone lines, the apparatus comprising:

a device comprising multiple ports for connection to a plurality of said telephone lines, a multiport POTS splitter configured to filter xDSL signals and to pass POTS signals transported on each of said plurality of said telephone lines, a multiple-terminal data output port, and an xDSL output circuit for providing at least said xDSL signals transported on each of said plurality of said telephone lines to said multiple-terminal data output port; and a data cable connected to said multiple-terminal data output port for transporting said xDSL signals to said DSL access multiplexer.

6. An apparatus as claimed in claim 5, wherein said enclosure comprises overvoltage protection circuits connected to respective ones of said ports.

7. An apparatus as claimed in claim 6, wherein said overvoltage protection circuits are mounted externally with respect to said device.

8. An apparatus as claimed in claim 7, wherein said device is configured to have surge protection devices externally and removable mounted thereto for providing surge protection to corresponding said telephone lines.

9. A system as claimed in claim 5, wherein said enclosure comprises at least one xDSL filter connected between said multiple ports and said multiple-terminal data output port to pass only xDSL signals to said data cable.

\* \* \* \* \*